United States Patent Office 3,050,518
Patented Aug. 21, 1962

3,050,518
5-CYANO AND 5-CARBAMYL STEROID DERIVATIVES
Albert Bowers and Howard J. Ringold, Mexico City, Mexico, assignors, by mesne assignments, to Syntex Corporation, a corporation of Panama
No Drawing. Filed July 17, 1959, Ser. No. 827,679
Claims priority, application Mexico July 22, 1958
20 Claims. (Cl. 260—239.55)

This invention relates to certain new cyclopentanophenanthrene derivatives and to a process for their preparation.

More particularly, it relates to the novel 5-cyano and 5-carbamyl analogs of the 4,5-dihydro derivatives of steroidal $\Delta^4$-hormones.

The new compounds which are the object of the present invention exhibit valuable therapeutic properties: they are antiestrogenic agents and show anti-pituitary activity.

These new anti-estrogenic agents and anti-pituitary agents are 5-cyano and 5-carbamyl analogs having the general formula:

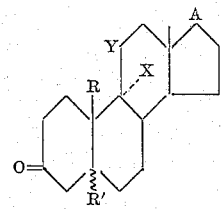

wherein A is a radical arrangement selected from the group consisting of

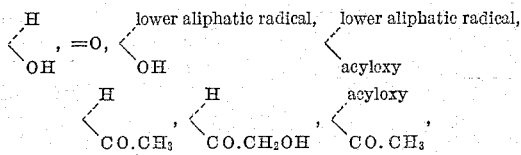

bis-methylenedioxy(BMD), and

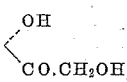

while R is a member selected from the group consisting of hydrogen and methyl; X is a member selected from the group consisting of hydrogen and fluorine; Y is a member of the group consisting of

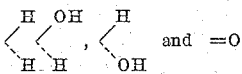

and R' is a radical selected from the group consisting of 5α- and 5β-cyano and -carbamyl.

By "lower aliphatic radical" we mean particular lower alkyl as for example methyl or ethyl, lower alkenyl such as vinyl, or propenyl, and lower alkinyl such as ethinyl, propinyl and the like; "acyloxy" is preferably the radical derived from a hydrocarbon carboxylic acid having up to 12 carbon atoms as is specifically set forth in the subsequent description of starting material.

The process according to the invention for preparing 5-cyano and 5-carbamyl analogs of the 4,5 derivatives of steroidal $\Delta^4$-3-keto hormones essentially consists in the reaction of such hormones with the cyanide of an alkali or alkaline earth metal, in the presence of a hydroxylated organic solvent.

The starting compounds for carrying out this process can be characterized by the following general formula:

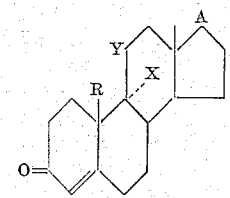

wherein A, R, X and Y have the same meaning as in the preceding formula.

The process of the invention can be represented by the following equation:

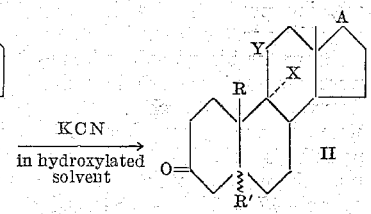

A, R, R', X and Y having the same meaning as explained hereinbefore.

More specifically, as starting material for the process according to our invention there can be used: testosterone, $\Delta^4$-androsten-3,17-dione, a 17α-alkyl (alkenyl, alkinyl)-testosterone or its esters, progesterone, desoxycorticosterone, a 17α-acyloxy-progesterone, as well as the 19-nor-analogs of such compounds, all of which may optionally be oxygenated at C–11 with a β-hydroxyl or a keto group and/or fluorinated at C–9α; Formula I also represents the 17,20;20,21 - bis - methylenedioxy derivatives of Reichstein's Compound "S," of 19-nor-"S" and of their analogs oxygenated at C–11 and/or fluorinated at C–9α (cf. Sarett et al., J. Am. Chem. Soc., 80, 1517 (1958)).

The process of the invention comprises the step of reacting one of the above-mentioned starting compounds with potassium cyanide. Preferably, the starting compound is refluxed with potassium cyanide in mixture with ethanol for a period of 1–5 hours and there is obtained a mixture of the 5α and 5β isomers of the 5-cyano and 5-carbamyl analogs of the 4,5-dihydro derivatives of the respective $\Delta^4$-3-keto hormones, and the mixture is separated into its components by chromatography.

Instead of potassium cyanide, there can be used another alkali metal cyanide such as sodium cyanide or calcium cyanide. Instead of ethanol, other hydroxylated organic solvents such as, for instance, a butanol, may be used.

More particularly, if the starting compound is testosterone, there are obtained the 5α- and 5β-isomers of 5-cyano-androstan-17β-ol-3-one and of 5-carbamyl-androstan-17β-ol-3-one.

Progesterone yields the 5α- and 5β-isomers of 5-cyano-pregnan-3,20-dione and of 5-carbamyl-pregnan-3,20-dione;

and desoxycorticosterone affords the 5α- and 5β-isomers of 5-cyano-pregnan-21-ol-3,20-dione and of 5-carbamyl-pregnan-21-ol-3,20-dione.

A testosterone substituted at C-17α with the residue of a lower aliphatic hydrocarbon, saturated or unsaturated, used as the starting compound affords the 5α- and 5β-isomers of the respective 17α-alkyl(alkenyl or alkinyl)-5-cyano-androstan-17β-ol-3-one and of the corresponding 17α-alkyl(alkenyl or alkinyl)-5-carbamyl-androstan-17β-ol-3-one.

A 17-ester of one of the last mentioned testosterone derivatives used as the starting compound yields the corresponding 5-cyano and 5-carbamyl compounds esterified at C-17, and a 17-ester of 17α-hydroxy-progesterone permits to obtain the 5α- and 5β-isomers of the corresponding 17-ester of 5-cyano-pregnan-17α-ol-3,20-dione and of 5-carbamyl-pregnan-17α-ol-3,20-dione.

In the compounds of Formula II having a primary hydroxyl group at C-21 or a secondary hydroxyl group at C-17β, these groups can be esterified by reaction with the anhydride of a hydrocarbon carboxylic acid of up to 12 carbon atoms, in pyridine solution; the anhydride may be derived from a hydrocarbon carboxylic acid of up to 12 carbon atoms, saturated or unsaturated, of straight, branched, cyclic or mixed cyclic-aliphatic chain, with or without methoxy, halogen or other substituents in the chain. We prepared among others, such esters as the acetates, propionates, butyrates, t-butyrates, hemisuccinates, enanthates, caproates, benzoates, trimethylacetates, phenylpropionates, phenoxyacetates, cyclopentylpropionates and β-chloropropionates; the starting compounds (I) may possess similar ester groups and, therefore, the reaction products obtained from the cyanide treatment according to the invention are correspondingly esterified.

From the bis-methylenedioxy (BMD) derivatives there were obtained the BMD derivatives, wherein the dihydroxyacetone side chain was regenerated by treatment with an aqueous organic acid. Thus, if the starting compound is 17,20;20,21-bis-methylenedioxy-Δ⁴-pregnen-3-one, there are obtained the 5α- and 5β-isomers of 5-cyano-17,20;20,21-bis-methylenedioxy-pregnan-3-one and of 5-carbamyl-17,20;20,21-bis-methylenedioxy-pregnan-3-one.

Starting compounds which have at C-10 a hydrogen atom instead of the angular methyl group, yield the 5-cyano and 5-carbamyl derivatives of the 19-nor-analogs of the above mentioned compounds.

In accordance with a further feature of the process according to the invention, the starting compounds are oxygenated at C-11 with a β-hydroxyl or keto group, or oxygenated at C-11 and fluorinated at C-9α, to produce the final compounds of the type described above correspondingly substituted at C-11 or at C-11 and C-9.

The above-mentioned 17,20;20,21-bis-methylenedioxy compounds and their 19-nor analogs or 11-oxygenated or 9α-fluorinated derivatives are treated with an aqueous organic acid in order to regenerate the dihydroxyacetone side chain, for example by heating with aqueous formic acid; there are thus treated the bis-methylenedioxy derivatives of the 5α- and 5β-isomers of 5-cyano-pregnan-17α, 21-diol-3,20-dione and of the corresponding compounds of the 19-nor-series, as well as those having an oxygen function at C-11 or an oxygen function at C-11 and a fluorine atom at C-9α; there are obtained the respective 5-cyano and 5-carbamyl analogs of pregnan-17α,21-diol-3,20-dione with or without the angular methyl group at C-10 and/or with an oxygen function at C-11 or an oxygen function at C-11 and a fluorine atom at C-9α.

According to another variation in practicing the process of invention, the 17,20;20,21-bis-methylenedioxy compounds are treated with aqueous acetic acid in the hot and the products resulting from this reaction are acetylated at C-21 by treatment with acetic anhydride in pyridine solution. There are thus obtained the above mentioned final compounds in the form of their 21-acetates.

The following specific examples serve to illustrate but are not intended to limit the present invention.

EXAMPLE I

A mixture of 5 g. of testosterone, 8 g. of potassium cyanide and 200 cc. of 95% ethanol was refluxed for 3 hours, cooled diluted with water and extracted with ether. The extract was washed with water, dried over anhydrous sodium sulfate and evaporated to dryness. The residue consisted of a mixture of 5-cyano-dihydrotestosterone (5α), of 5-cyano-testan-17β-ol-3-one (5β), of 5-carbamyl-dihydrotestosterone (5α) and of 5-carbamyl-testan-17β-ol-3-one (5β). By chromatography on neutral alumina there were separated the 5-cyano from the 5-carbamyl compounds and the 5α- and 5β-isomers were isolated.

EXAMPLE II

In another experiment, in accordance with the preceding example, methanol was substituted for ethanol, and the mixture was refluxed for 5 hours, with the same final results.

Following the procedures of the previous examples, the final products listed in Table I given hereinafter can be obtained from the indicated starting materials:

*Table I*

| Example No. | Starting Compound | Products |
|---|---|---|
| III | 19-nor-testosterone | 5α and 5β-isomers of 5-cyano-19-nor-androstan-17β-ol-3-one and 5-carbamyl-19-nor-androstan-17β-ol-3-one. |
| IV | 11-keto-testosterone | 5α and 5β-isomers of 5-cyano-androstan-17β-ol-3,11-dione and 5-carbamyl-androstan-17β-ol-3,11-dione. |
| V | 11β-hydroxy-testosterone. | 5α and 5β-isomers of 5-cyano-androstan-11β,17β-diol-3-one and 5-carbamyl-androstan-11β,17β-diol-3-one. |
| VI | 11-keto-19-nor-testosterone. | 5α and 5β-isomers of 5-cyano-19-nor-androstan-17β-ol-3,11-dione and of 5-carbamyl-19-nor-androstan-17β-ol-3,11-dione. |
| VII | 11β-hydroxy-19-nor-testosterone. | 5α and 5β-isomers of 5-cyano-19-nor-androstan-11β,17β-diol-3-one and of 5-carbamyl-19-nor-androstan-11β,17β-diol-3-one. |
| VIII | 17α-acetoxy-progesterone. | 5α and 5β-isomers of 5-cyano-17α-acetoxy-pregnan-3,20-dione and of 5-carbamyl-17α-acetoxy-pregnan-3,20-dione. |
| IX | 11-desoxycorticosterone | 5α and 5β-isomers of 5-cyano-pregnan-21-ol-3,20-dione and 5-carbamyl-pregnan-21-ol-3,20-dione. |
| X | Corticosterone | 5α and 5β-isomers of 5-cyano-pregnan-11β,21-diol-3,20-dione and 5-carbamyl-pregnan-11β,21-diol-3,20-dione. |
| XI | Δ⁴-pregnen-21-ol-3,11,20-trione. | 5α and 5β-isomers of 5-cyano-pregnan-21-ol-3,11,20-trione and 5-carbamyl-pregnan-21-ol-3,11,20-trione. |
| XII | 19-nor-11-desoxycorticosterone. | 5α and 5β-isomers of 5-cyano-19-nor-pregnan-21-ol-3,20-dione and 5-carbamyl-19-nor-pregnan-21-ol-3,20-dione. |
| XIII | 19-nor-corticosterone | 5α and 5β-isomers of 5-cyano-19-nor-pregnan-11β,21-diol-3,20-dione and 5-carbamyl-19-nor-pregnan-11β,21-diol-3,20-dione. |
| XIV | 19-nor-Δ⁴-pregnen-21-ol-3,11,20-trione. | 5α and 5β-isomers of 5-cyano-19-nor-pregnan-21-ol-3,11,20-trione and 5-carbamyl-19-nor-pregnan-21-ol-3,11,20-trione. |
| XV | 17,20;20,21-bis-methylenedioxy-pregnan-3-one. | 5α and 5β-isomers of 5-cyano-17,20;20,21-bis-methylenedioxy-pregnan-3-one and 5-carbamyl-17,20;20,21-bis-methylenedioxy-pregnan-3-one. |
| XVI | 19-nor-analog of starting compound of Example XV. | 19-nor analog of products of Example XV. |
| XVII | 11β-hydroxy-analog of starting compound of Example XV. | 11β-hydroxy-analogs of products of Example XV. |
| XVIII | 11-keto-analog of starting compound of Example XV (17,20;20,21-BMD-cortisone). | 11-keto-analogs of products of Example XV. |
| XIX | 9α-fluoro analog of starting material of Example XV. | 9α-fluoro analogs of products of Example I. |

Table I—Continued

| Example No. | Starting Compound | Products |
|---|---|---|
| XX | 17α-propyl-testosterone | 5α and 5β-isomers of the 5-cyano and 5-carbamyl analogs of 17α-propyl-androstan-17β-ol-3,11-dione. |
| XXI | 17α-vinyl-testosterone | 5α and 5β-isomers of the 5-cyano and 5-carbamyl analogs of 17α-vinyl-androstan-17β-ol-3,11-dione. |
| XXII | 17α-iso-propen(-1)yl-progesterone. | 5α and 5β-isomers of the 5-cyano and 5-carbamyl analogs of 17α-iso-propenyl-pregnan-3,20-dione. |
| XXIII | 17α-alkyl-testosterone | 5α and Bβ-isomers of the 5-cyano and 5-carbamyl analogs of 17α-alkyl-androstan-17β-ol-3,11-dione. |
| XXIV | 17α-pentenyl-progesterone. | 5α and Bβ-isomers of the 5-cyano and 5-carbamyl analogs of 17α-pentenyl-pregnan-3,20-dione. |
| XXV | 17α-ethiny-corticosterone. | 5α and 5β-isomers of the 5-cyano and 5-carbamyl analogs of 17α-ethinyl-pregnan-11β,21-diol-3,20-dione. |
| XXVI | 17α-propin(-1)yl-testosterone. | 5α and 5β-isomers of the 5-cyano and 5-carbamyl analogs of 17α-propinyl-androstan-17β-ol-3,11-dione. |

EXAMPLE XXVII

A mixture of 5 g. of 5α-cyano-17,20;20,21-bis-methylene-dioxy-pregnan-11β-ol-3-one, the BMD compound produced in the preceding Example XVII and 100 cc. of 60% formic acid was stirred on a steam bath for 1 hour and cooled; the precipitate was collected by filtration, washed with water, dried and recrystallized from acetone-hexane. There was thus obtained 5α-cyano-pregnan-11β,17α,21-triol-3,20-dione, namely 5α-cyano-4,5-dihydro-hydrocortisone.

Following the procedure of Example XXVII, the final products listed in Table II below can be obtained from the indicated starting materials:

Table II

| Example No. | Starting Material | Final Product |
|---|---|---|
| XXVIII | Final products of Example XV. | 5α and 5β-isomers of 5-cyano-pregnan-17α,21-diol-3,20-dione and 5-carbamyl-pregnan-17α,21-diol-3,20-dione. |
| XXIX | Final products of Example XVIII. | 5α and 5β-isomers of 5-cyano- and 5-carbamyl analogs of 4,5-dihydrocortisone. |
| XXX | Final products of Example XIX. | 5α and 5β-isomers of 5-cyano and 5-carbamyl analogs of 9α-fluoro-4,5-dihydro-hydrocortisone. |

EXAMPLE XXXI

A mixture of 1 g. of 5α-cyano-pregnan-11β,17α-21-triol-3,20-dione, obtained as described in Example XX, 5 cc. of acetic anhydride and 10 cc. of pyridine was kept overnight at room temperature and then poured into water, heated for 1 hour on a steam bath and cooled; the precipitate was collected, washed with water, dried and recrystallized from acetone-hexane, thus producing 5α-cyano-pregnan-11β,17α,21-triol-3,20-dione 21-acetate.

EXAMPLE XXXII

By following the procedure of Example XXXI, there was prepared 5β-carbamyl-dihydrotestosterone 17-propionate by reaction of the free compound with propionic anhydride.

Following the procedure of Example XXXII, the final products listed in Table III below can be obtained from the starting compounds indicated.

Table III

| Example No. | Starting Material | Acid Anhydride | Final Product |
|---|---|---|---|
| XXXIII | 5α-cyano product of Example I. | acetic anhydride. | 17-acetate of 5α-cyano product of Example I. |
| XXXIV | 5β-cyano product of Example V. | propionic anhydride. | 17-propionate of 5β-cyano product of Example V. |
| XXXV | 5α-carbamyl product of Example VI. | benzoic anhydride. | 17-benzoate of 5α-carbamyl product of Example VI. |
| XXXVI | 5β-carbamyl product of Example X. | cyclopentyl-propionic anhydride. | 21-cyclopentylpropioante of 5β-carbamyl-pregnan-11β,21-diol-3,20-dione. |
| XXXVII | 5β-cyano product of Example V. | butyric anhydride. | 17-butyrate of 5-cyano testan-17β-ol-3-one. |
| XXXVIII | 5β-cyano product of Example I. | caproic anhydride. | 17-caproate of 5-cyano testan-17β-ol-3-one. |
| XXXIX | 5β-cyano product of Example I. | cyclopentyl-propionic anhydride. | 17-cyclopentylpropionate of 5-cyano testan-17β-ol-3-one. |

EXAMPLE XL

Alternatively, the dihydroxyacetone side chain was regenerated by heating a 5-cyano or 5-carbamyl-17,20;20,21-bis-methylenedioxy-pregnane with 50% acetic acid for 7 hours at 100° C.; the product was precipitated by diluting with water and then acetylated at C-21 by the method of Example XXXI. There was thus prepared, for example, 5α-cyano-4,5-dihydro-cortisone 21-acetate.

We claim:

1. A process for preparing 5-cyano and 5-carbamyl analogs of certain 4,5 dihydro derivatives of steroidal Δ⁴-3-keto-hormones, comprising the steps of reacting a starting compound having the general formula:

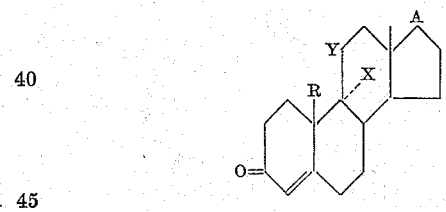

wherein A is a radical arrangement selected from the group consisting of

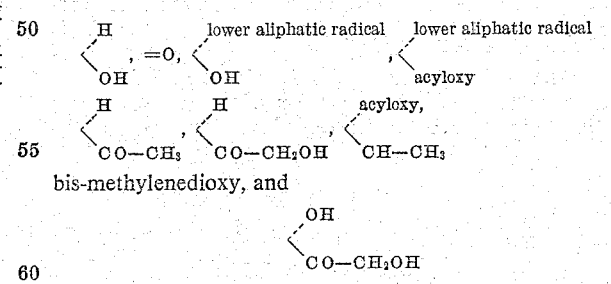

bis-methylenedioxy, and

wherein the acyl radical is derived from a hydrocarbon carboxylic acid of less than 12 carbon atoms; R is a member selected from the group consisting of hydrogen and methyl, X is an atom selected from the group consisting of hydrogen and fluorine, and Y is a member selected from the group consisting of H, $$\overset{OH}{\underset{\sim H}{\vert}}, \text{ and } =O$$

with the cyanide of a metal selected from the group consisting of the alkali-metals and the alkaline earth metals, in the presence of a hydroxylated organic solvent, so as to produce a new mixture of analogs being of the general formula:

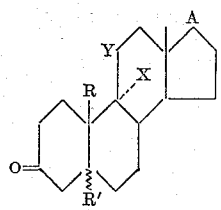

wherein A, R, X and Y have the same significance as in the general formula of said starting material; and R' is selected from the group consisting of cyano and carbamyl, and separating the mixture to isolate the individual analogs therefrom.

2. The process according to claim 1, characterized in that the starting compound is refluxed for from about one to five hours with potassium cyanide in mixture with a solvent which is a lower fatty alcohol.

3. The process according to claim 1, characterized in that the cyanide is sodium cyanide.

4. The process as described in claim 1, characterized in that the starting compound is 17,20;20,21-bis-methylenedioxy-$\Delta^4$-pregnen-3-one, and further comprising the step of heating the resulting compounds in aqueous organic acid in order to regenerate the dihydroacetone side chain of the aforesaid starting compound.

5. The process as described in claim 1, further comprising the step of reacting a resulting analog with the anhydride of a carboxylic acid having up to 12 carbon atoms, so as to produce the corresponding ester of the analog having the primary and secondary hydroxyl groups thereof esterified.

6. A compound of the following formula:

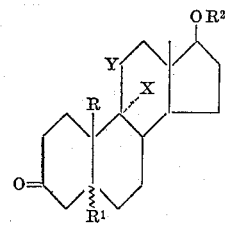

wherein R is selected from the group consisting of hydrogen and methyl; $R^1$ is selected from the group consisting of cyano and carbamyl; $R^2$ is selected from the group consisting of hydrogen and a hydrocarbon carboxylic acyl group of less than 12 carbon atoms; Y is selected from the group consisting of hydrogen, $\beta$-hydroxyl, $\alpha$-hydroxyl and keto and X is selected from the group consisting of hydrogen and fluorine.

7. A compound of the following formula:

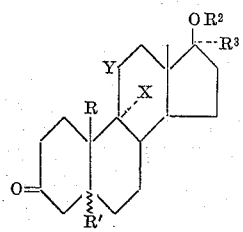

wherein R is selected from the group consisting of hydrogen and methyl; $R^1$ is selected from the group consisting of cyano and carbamyl; $R^2$ is selected from the group consisting of hydrogen and a hydrocarbon carboxylic acyl group of less than 12 carbon atoms; $R^3$ is selected from the group consisting of lower alkyl, lower alkenyl and lower alkinyl radicals; Y is selected from the group consisting of hydrogen, $\beta$-hydroxyl, $\alpha$-hydroxyl and keto and X is selected from the group consisting of hydrogen and fluorine.

8. A compound of the following formula:

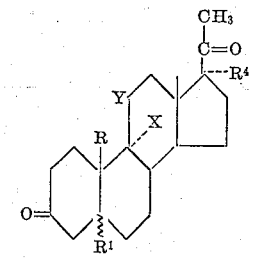

wherein R is selected from the group consisting of hydrogen and methyl; $R^1$ is selected from the group consisting of cyano and carbamyl; Y is selected from the group consisting of hydrogen, $\beta$-hydroxyl, $\alpha$-hydroxyl and keto; X is selected from the group consisting of hydrogen and fluorine and $R^4$ is selected from the group consisting of hydrogen, hydroxy and hydrocarbon carboxylic acyloxy of less than 12 carbon atoms.

9. A compound of the following formula:

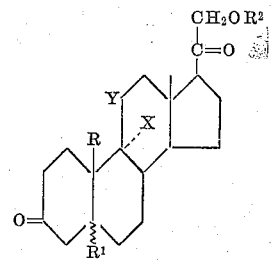

wherein R is selected from the group consisting of hydrogen and methyl; $R^1$ is selected from the group consisting of cyano and carbamyl; $R^2$ is selected from the group consisting of hydrogen and a hydrocarbon carboxylic acyl group of less than 12 carbon atoms; Y is selected from the group consisting of hydrogen, $\beta$-hydroxyl, $\alpha$-hydroxyl and keto and X is selected from the group consisting of hydrogen and fluorine.

10. A compound of the following formula:

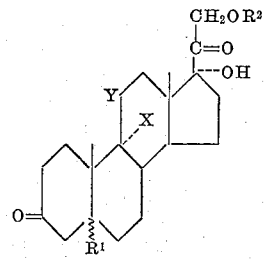

wherein $R^1$ is selected from the group consisting of cyano and carbamyl; $R^2$ is selected from the group consisting of hydrogen and a hydrocarbon carboxylic acyl group of less than 12 carbon atoms; Y is selected from the group consisting of hydrogen, $\beta$-hydroxyl, $\alpha$-hydroxyl and keto and X is selected from the group consisting of hydrogen and fluorine.

11. A compound of the following formula:

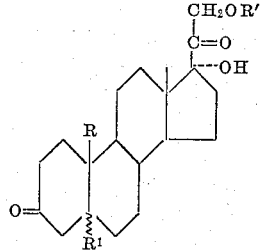

wherein R is selected from the group consisting of hydrogen and methyl; $R^1$ is selected from the group consisting of cyano and carbamyl; and $R^2$ is selected from the group consisting of hydrogen and a hydrocarbon carboxylic acyl group of less than 12 carbon atoms.

12. A compound of the following formula:

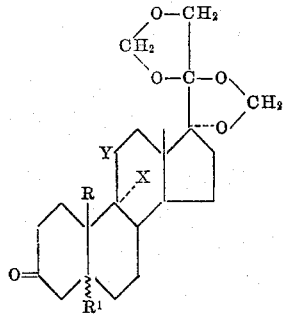

wherein R is selected from the group consisting of hydrogen and methyl; $R^1$ is selected from the group consisting of cyano and carbamyl; X is selected from the group consisting of hydrogen and fluorine and Y is selected from the group consisting of hydrogen, β-hydroxyl, α-hydroxyl and keto.

13. 5-cyano-dihydrotestosterone.
14. 5β-carbamyl-dihydrotestosterone-17-propionate.
15. 5α-cyano-4,5-dihydro-cortisone-21-acetate.
16. 5α-cyano-4,5-dihydro-hydrocortisone-21-acetate.
17. The hydrocarbon carboxylic acid esters of less than 12 carbon atoms of 5-cyano-17α-hydroxy-pregnane-3,20-dione.
18. The hydrocarbon carboxylic acid esters of less than 12 carbon atoms of 5-carbamyl-17α-hydroxy-pregnane-3,20-dione.
19. 5-cyano-pregnane-17α,21-diol-3,20-dione.
20. 5-carbamyl-pregnane-17α,21-diol-3,20-dione.

No references cited.